May 10, 1960   C. G. HÅRD AF SEGERSTAD   2,935,972
OPERATING AND CONTROLLING DEVICE
Filed Dec. 15, 1953   2 Sheets-Sheet 1
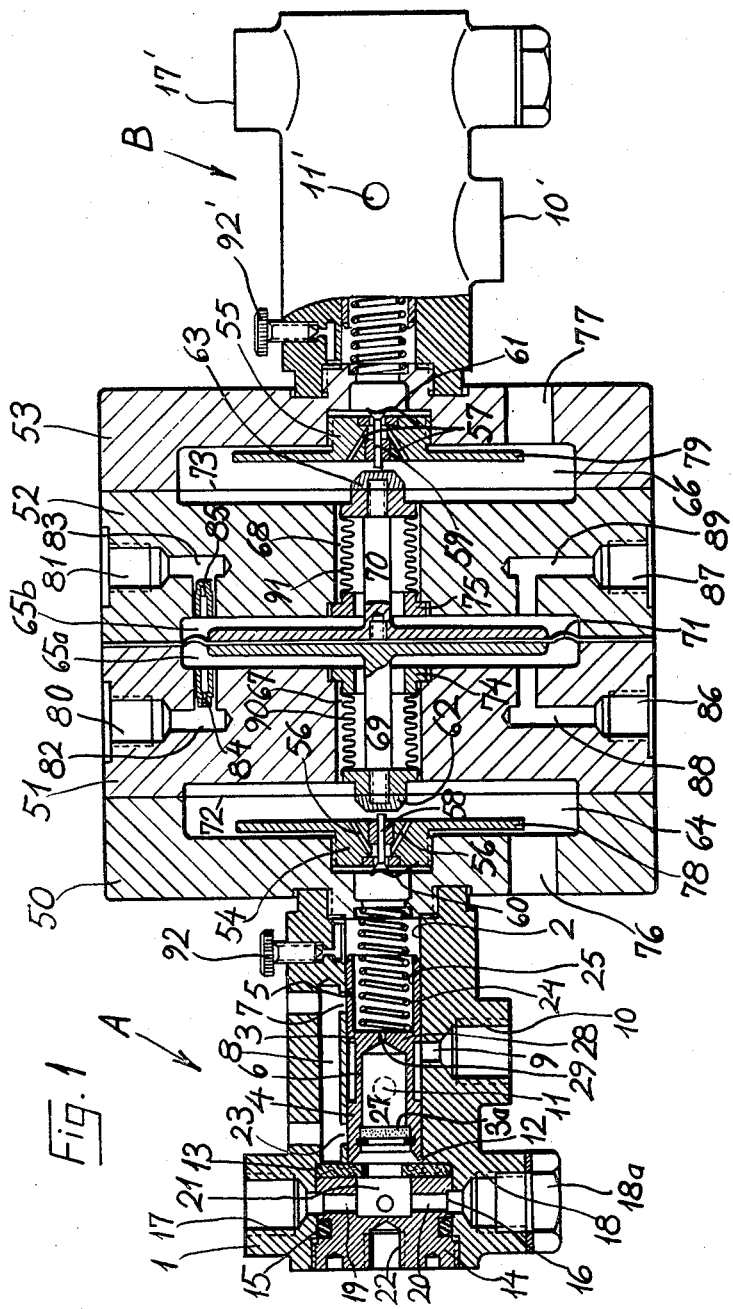
INVENTOR
CARL GUSTAF HÅRD AF SEGERSTAD
BY
Curtis, Morris + Safford
ATTORNEYS

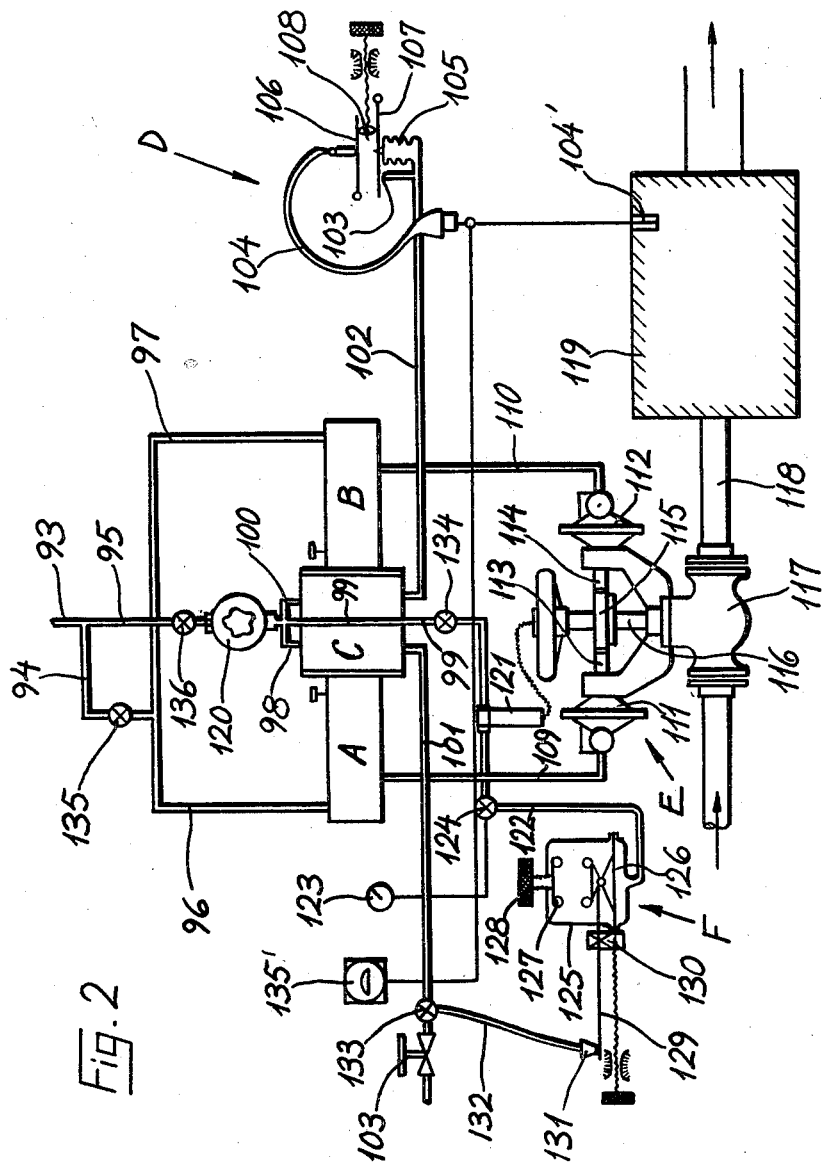

United States Patent Office 2,935,972
Patented May 10, 1960

2,935,972

OPERATING AND CONTROLLING DEVICE

Carl Gustaf Hård af Segerstad, Sandviken, Sweden

Application December 15, 1953, Serial No. 398,309

Claims priority, application Sweden September 3, 1953

6 Claims. (Cl. 121—46.5)

My present invention relates to operating and controlling devices.

An object of the invention is to provide an operating and controlling device which is sensitive only to a predetermined degree of variations of a physical magnitude according to which a process is to be conducted.

Another object of the invention is to provide a device which is capable of giving impulses to correcting, resetting, or regulating driving units in such a manner that the speed and force of these driving units are dependent upon there occurring from time to time deviations from a certain predetermined value of any physical magnitude.

A further object is to provide a device capable of building up pressure differences which are dependent on the deviations of the physical magnitude.

A still further object is to provide a controlling device which consumes no medium or only minute quantities of medium for driving the said units when the value of the physical magnitude is within certain predetermined limits.

The invention also consists in certain other features of construction and in the combination and arrangement of the parts, members and instruments to be hereinafter fully described, illustrated in the accompanying drawings and specifically pointed out in the appended claims.

In the drawings,

Fig. 1 is a sectional view of a preferred embodiment of a unit of the device according to the invention, and Fig. 2 is a diagrammatical view of an operating and controlling device according to the invention which device forms a complete regulator system.

Referring now to Fig. 1 a unit of the device consists of two similar or identical valve devices, designated as a whole by A and B, respectively. The valve device B is only partly sectioned and therefore the valve device A will now be described more in detail.

1 designates a valve case having a boring 2 in which a valve member designated as a whole by 3 is movable to and fro in the longitudinal direction of the boring. The valve member 3 has two cylindrical portions 4 and 5 which are sealing against the walls of the boring and separated by a portion 6 of reduced diameter. The middle portion of the valve member, provided with this reduced diameter is adapted to function as a slide valve, in that the same is adapted to cooperate with an opening 7 in the boring of a canal 8 arranged in the valve case 1 and serving the purpose to supply pressure medium which may be gaseous or liquid at will, and another opening 9 in the boring communicating with a working place and being provided with a threaded connection 10 in order to be connected to pressure medium supply lines and with a third opening 11 which forms an exhaust for the pressure medium. In Fig. 1 the valve member of the valve device A is illustrated in its left end position, in which connection is established between the openings 9 and 11 while the cylindrical portion 5 is closing the opening 7. In the said end position of the valve member this is abutting on and sealing against an annular packing 13 by a comparatively narrow annular surface 12. The cylindrical portion 4 of the valve member thus forms by its annular face 12 a seat valve. The packing 13 is retained in a sealing abutment on a shoulder formed in the valve case 1 by a plug 14 which is in engagement with the valve case by threads, an elastic ring 15 ensuring proper sealing between the valve case and the plug. The plug has a peripheral groove 16 which communicates on one hand with connections 17 and 18 for pressure medium supply lines and on the other through passages 19 and 20 with a boring 21 in the plug. With a view to facilitating the mounting of the whole device the plug is further provided with a threaded hole 22.

In the position shown of the valve member 3 an opening 23 of the passage 8 is closed by the portion 4 of the valve member. In its other end position, i.e. the right end position, this opening 23 is free and communicating with a source of pressure medium through the hole in the packing 13, the boring 21, the passages 19 and 20, the groove 16 and lines connected to the connection 17 but not shown in Fig. 1, the connection 18 being closed by a plug 18a. As further in the said right end position of the valve member 3 the outlet or exhaust opening 11 is closed by the portion 4 and the openings 7 and 9, as readily will be seen, communicate with each other, pressure medium will therefore be supplied to the working place through a line connected to the connection 10. When the valve the next time occupies its left end position the supply to the working place of pressure medium will be interrupted and pressure medium will leave this place through the outlet 11, and so on.

It will be clear from the description above that the valve member 3 is formed and functions as a seat valve as well as a slide valve.

A helical spring 24, abutting on the valve member 3 in a boring 25 therein, tends to retain the valve member in the left end position shown sealing against the annular packing 13. The valve member 3 has a further boring 27 and the two borings 25 and 27 are arranged in such a way that between them is formed within the valve member a partition wall 28 having a constricted passage 29 through which the two boring are interconnected. The partition wall serves the purpose of providing under certain circumstances, which will be described below, a pressure difference between the two compartments on both sides of the wall whereby the valve member can be opened by influence of the pressure medium introduced at the opening 17 and against the force exerted by the spring 24. The opening 29, on the other hand, is adapted to reestablish balance between the pressures in the two compartments so that the spring 24 is able again to throw the valve member back to the left against its seat formed by the packing 13.

3a designates a porous filter element.

The valve device A and the like valve device B are both mounted on a body formed by four suitably circular or cylindrical parts 50, 51, 52, and 53 held together by means of bolts or the like not shown in the drawing. The valve devices A and B are fastened to the outer sides of the parts 50 and 53 respectively by means of threads. These parts 50 and 53 have each a central boring into which borings are adjustably threaded members 54 and 55 respectively. Members 54 and 55 have constricted passages 56 and 57 respectively, and there are small seat valves 58 and 59, respectively, which control the flow through these passages. These valves are normally urged in sealing contact with their seats by means of leaf springs 60 and 61. They have, however, relatively long stems which are directed in opposite directions and project out of the ends of their guides in order to be operable by operating members 62 and 63 respectively so as to cause the valves to open and close in dependence on the movements of the operating members. The operating mechanism will now be described.

The parts 50, 51, 52, and 53 are all provided with turned out portions which correspond to each other in such a manner that three substantially circular chambers 64, 65a—65b, and 66 are formed. The parts 51 and 52 are further provided with borings 67 and 68, respectively. The operating members 62 and 63 are rigidly interconnected in that they are threaded on the stems of two (which appear in the drawing in section as substantially T-formed) parts 69 and 70 having disk portions fastened to each other and clamping between them a membrane 71 which is further clamped at its periphery between the body parts 51 and 52. The circular chamber 65a—65b is divided by the membrane 71 into two compartments 65a and 65b. Clamped between the parts 50 and 51 is a leaf spring 72, and clamped between the parts 52 and 53 is a leaf spring 73. As will be clear from the drawing these leaf springs are also clamped in the operating members 62 and 63, respectively, each of which consists of two threaded parts mounted on correspondingly threaded portions of the stems 69 and 70. The leaf springs serve to support and guide the operating members when these are moved to and fro with respect to the valves 58 and 59. It should be observed that the leaf springs do not divide either of the chambers 64 and 66 into separate compartments. The arrangement is preferably such that the leaf springs tend to hold the operating members 62 and 63 in the middle or central position illustrated. This involves, that neither of the working places connected to the valve devices A and B is supplied with pressure medium. In the ends of the borings 67 and 68 which are adjacent to the chamber 65a—65b are two annular members 74 and 75 which seal against the walls of the borings. These members are connected to the operating members 62 and 63, respectively, by sealing bellows 90 and 91. The compartments on both sides of the membrane 71 are thus completely separated from the chambers 64 and 66, respectively. These last-mentioned chambers communicate with the surrounding atmosphere through openings 76 and 77, respectively, which are outlets for pressure medium passing through the constricted passages 56 and 57, respectively. The openings 76 and 77 are so large that they admit manipulation of plates or flanges 78 and 79, respectively, formed on the members 54 and 55, respectively, in order to make it possible to adjust or set these members. Rotation of the flanges may be executed by means of special devices mounted in the openings. The body parts 51 and 52 have threaded connections 80 and 81, respectively, adapted to receive lines connected to a source of pressure medium in order to supply pressure medium of constant pressure. The connections 80 and 81 are connected to the compartments 65a and 65b, respectively, through passages 82 and 83, respectively, and nozzles 84 and 85, respectively, with constricted passages. Further, the body parts 51 and 52 each have one of two connections 86 and 87, respectively, which are likewise connected to the compartments 65a and 65b, through passages 88 and 89, respectively, however, without constricted nozzles. One of these last-mentioned connections, e.g., the connection 87, is provided to receive a pressure inducing device for obtaining an adjustable or controllable pressure, while the other connection 86 is adapted to be connected to an adjustable outlet or exhaust leak or bleed. By adjusting this bleed the characteristics of the function of the whole device may readily be adjusted at will.

The unit described above functions in the following manner. As long as the valves 58 and 59 are in their closed positions the valve members 3 of the valve devices A and B are in their closed positions, i.e. abutting on the packings 13. The valve members are retained in these positions by the force of their springs 24 and also by the pressure corresponding to the annular abutting face 12 of the valve members. As will be clear from the above description the said valves 58 and 59 are, indeed closed as long as the pressures on both sides of the membrane 71 are balancing each other and the supply of pressure medium to the working places is interrupted. However, if the pressure transmitted to the compartment 65b through the passage 89 is increasing while the pressure in compartment 65a remains constant and unchanged, the membrane 71 will be actuated by an overpressure in the said compartment 65b, which acts against the action of the leaf springs 72 and 73 and the bellows 90 and 91 and moves all the system connected to the membrane, including the operating members 62 and 63, in a direction to the left in Fig. 1. This causes the operating member 62 to actuate the valve 58 and open the outlet through the constricted passages 56 of the member 54. The opening of the passages 56 is followed by a decrease of the pressure in the compartment on the right side in Fig. 1 of the partition wall 28 of the valve member 3, because pressure medium will now escape through the passages 56 into the chamber 64 and find its way out to the surrounding atmosphere through the opening 76. When a certain value of pressure difference is established on the two sides of the partition wall the force of the spring 24 and the "resistance" due to the abutting face 12 will be neutralized so that the valve member 3 of the valve device A is moved to the right in Fig. 1. It will readily be understood that the more the pressure rises in the compartment 65b the more the valve 58 is opened and the more powerful the pressure difference acting on the valve member will be. On the other hand, the more powerful this pressure difference develops the more the valve member will be pushed to the right against the action of the spring 24. Thus it will be seen that a certain pressure difference between the two compartments 65a and 65b will cause the valve member 3 to move to a certain position in its boring and also, which is of the greatest interest and very important, to uncover to a certain degree the opening 23 in the boring. Further, each different degree of such uncovering will always be followed by a corresponding degree of quantity and velocity of flows of the pressure medium delivered to the working place through the opening 23, the passage 8, the opening 7 and the passage 9, and there will be a corresponding output of the working unit at the working place. Thus this output will be proportional to the overpressure in the compartment 65b or, in fact, to the deviation in question of the physical magnitude, which has caused the overpressure. If the deviation is great the opening 23 will be fully uncovered and therefore the output of the said working unit will be a maximum.

If, on the other hand, the pressure in the compartment 65b is decreasing the pressure in compartment 65a is unchanged, the operating member 63 will open the valve 59 against the influence of the spring 61. This will put the valve device B in operation as well as the working unit connected thereto in the same manner as described above with reference to the valve device A.

It is to be observed that the two valve devices are never operative at the same time. This is due to the fact that when the pressures are substantially equal on both sides of the membrane 71 neither of the operating members 62 and 63 is in contact with its valve 58 or 59, respectively. In fact, in a preferred embodiment there is, under the said circumstance, a certain play between the operating members and their respective cooperative valves. This involves an important advantage, in that negligible deviations or "errors" of the above-mentioned physical magnitude will not bring either valve device or working unit into operation.

In order to make it possible to adjust the sensitiveness or characteristics of the two valve devices there are provided needle valves 92 and 92' communicating with the borings 2 on the "inner" sides of the partition walls 28.

The above described proportional control unit forms an integral part of the proportional control and positioner system shown in Fig. 2. In this figure the two valve devices are, as above, designated by A and B. The regulator body is as a whole designated by the general reference character C. A main supply lines 93 is connected to a source of pressure medium which preferably is gaseous but may be liquid. The line 93 is forked into two branches 94 and 95. The former branch 94 is further forked into two branches 96 and 97 which are connected to the inlet connections or openings 17, 17' of the two valve devices A and B, while the latter branch 95 is branched into three lines 98, 99, and 100, of which the lines 98 and 100 are connected to the connections 80 and 81, respectively, of the controller or regulator body C. The line 99 is connected to a position transmitter device which will be described later. Connected respectively to the openinges 86 and 87 of the regulator body C are two lines 101 and 102. The line 101 is terminated by a bleed or leak valve 103 which serves the purpose of setting or adjusting the reference or basic pressure in the compartment 65a on the left side of the membrane 71 in the controller body. The line 102 is connected to a measuring instrument as a whole designated by D and adapted to constrict more or less an outlet opening 103 of the line 102 in accordance with variations of any kind in a process of any arbitrary character and thus to transmit pressure impulses to the compartment 65b on the right side of the membrane in the controller body C in accordance with such variations. A detector device 104 of any type known per se may be used in connection with the instrument D as well as an indicating or recording device 135'. The measuring instrument D may consist substantially of a bourdon-tube 104, a bellows 105 connected to the line 102, two hinged links 106 and 107, and between these links an adjustable contact member 108. The operative connection parts 106, 107, and 108 make it possible to vary within very wide limits the sensitiveness of the measuring instrument.

To the connections or openings 10 and 10' of the valve devices are connected two lines 109 and 110 respectively for supplying pressure medium to a driving or servo unit as a whole designated by the reference character E and consisting mainly of two separately operative, reciprocative driving means adapted to actuate in opposite directions the devices which are to be regulated or controlled. In the embodiment shown the servo unit E suitably is of the type or construction fully described in my copending patent application Serial No. 158,115, filed on April 26, 1950 which issued as Patent No. 2,841,119 on July 1, 1958. The two independent, separately operative driving means 111 and 112 are adapted to actuate their reciprocating pawls 113 and 114, respectively, thereby to turn a cog wheel 115 rigidly mounted on the spindle 116 of a valve device 117. The two driving means or servo motors 111 and 112 are interconnected by a frame provided with means for mounting the entire assembly unit on the case of the valve device 117. It will be seen that, when the valve device A is active, i.e. supplying pressure medium to the driving unit or motor 111 the spindle 116 will be turned in one direction, while the spindle will be turned in the opposite direction when the valve device B supplies pressure medium to "its" motor 112. The valve device 117 which is positively controlled in that manner is adapted to deliver through a line 118 substances of any kind to the processing zone or room 119 of the process which is to be governed. 120 designates a constant pressure regulator which always ensures that pressure medium of the correct predetermined or adjustable pressure is delivered to the controller body.

The function of the system described above is as follows: Assume that the quantity of substances delivered to the process zone 119 through the valve 117 is measured to be too great by the detector 104—104' and the measuring instrument D, a pressure impulse is transmitted through the line 102 to the compartment 65b of the controller body causing the pressure to rise in this compartment. When the rising pressure has reached a certain value the valve device A will be active and put its motor 111 into operation. This motor turns the spindle 116 in such a direction that the quantity delivered through the valve 117 through the line 118 is decreased. Should the delivered substances still be measured to be too great and due to any cause greater than before, the pressure in the compartment will rise still more and the motor will operate at a greater speed than before. When the quantity of the delivered substances again reaches a value which measured by the instrument D is normal or in any case within certain permissible limits the pressure in the compartment 65b will be at least approximately the same as in the compartment 65a and the valve device A will be inactive and the motor 111 inoperative. On the other hand, should the said delivered quantity be measured to be too small, the pressure in the compartment 65b will fall, and at a certain value bring the valve device B and the motor 112 into operation. This will turn the spindle in the opposite direction for increased delivery of substances to the place of process. And again, the more the pressure in the compartment 65b falls, the more effective is the motor 112 and the greater the quantity of the substances delivered to the process. The controlling system according to the invention will thus always ensure a most effective control which is proportional to the occurring deviations from a certain ideal value or predetermined limits on both sides of this value. The system according to the invention also provides for a very convenient remote control because, as readily will be understood, the various lines of the system may have quite arbitrary lengths. The said "ideal" or desired value may readily be chosen at will by simple adjustment of the bleed valve 103. By setting the needle valves 92 and 92' of the valve devices A and B it is further possible, as mentioned above, to alter the characteristics of the valve devices and, therefore, of the whole system.

The control device or system shown in Fig. 2 which makes possible a most efficient automatic, proportional, and remote control or operation also comprises an apparatus for obtaining an adjustable and automatic "positioning" in accordance with arbitrary magnitudes such as the concentration in any respect of fluid media delivered through the valve 117. The apparatus also includes a position recorded and transmitter 121, which advantageously may be of the type described in my Swedish patent application No. 9236/52, filed on October 17, 1953, and a position transducer as a whole designated by F. The position transmitter is positively mechanically connected to the valve spindle 116 through a flexible driving shaft. The transmitter is adapted to transmit pressure impulses to the transducer via a line 122 in accordance with the positions of the spindle, i.e. higher pressure impulses in one direction of rotation of the spindle and lower pressure impulses in the opposite direction. A position indicator 123 may be connected to the line 122 by means of a three-way cock 124. The transducer comprises a casing 125 with a membrane 126 sensitive to the pressure impulses coming from the position transmitter 121. The transmitted pressure is balanced by a spring 127, the tension of which can be set or adjusted by means of a screw 128. Hinged directly or indirectly to the membrane is a lever 129 tiltable on an adjustable fulcrum member 130. The lever serves the purpose of throttling more or less a nozzle 131 forming an outlet for a line 132 connected via a three-way cock 133 to the line 101 from the compartment 65a. The more the nozzle is throttled the more the pressure rises in the compartment 65a and vice versa. It will also be clear from the above description that rotation of the spindle 116 in one direction will cause the pressure in the said compartment to rise, while rotation in the opposite direction will cause it to fall. By proper setting of the screw 128 and the fulcrum member based upon experience and in accordance with known values or characteristics of the substances or with known requirements of the process, it is possible to have a correct or desired pressure in the compartment 65a which pressure always corresponds to the actual position of the valve 117. When the "positioning apparatus" is used the bleed valve 103 is closed or otherwise made inoperative by turning three-way cock 133. The lines 99, 94, and 95 may for practical purposes likewise have cocks 134, 135, and 136 respectively.

Obviously, the specific forms of my invention described herein for the purpose of disclosure and to illustrate the principles involved will quite certainly suggest to those skilled in the art various further changes, modifications, and substitutions that do not depart from the scope of my invention.

Having now described my invention, what I claim as new and desire to secure by Letters Patent is:

1. In apparatus of the character described, the combination of, two separately operative valve devices, two separately operative driving means adapted to exert actuating forces in opposite directions, one of said valve devices being connected to deliver an operating medium to one of said driving means and the other of said valve devices being connected to deliver an operating medium to the other of said driving means, each of said valve devices having a valve member which is adapted to move between a closed position wherein no operating medium is delivered to its driving means and a fully open position wherein the operating medium is delivered to its driving means at the maximum rate, each of said valve devices including two pressure chambers one of which is connected directly to a source of pressure medium and the other of which is connected to the source of pressure medium through a restriction, the second mentioned of said pressure chambers having an exhaust valve, means biasing said exhaust valve to closed position whereby the first-mentioned pressure chamber is maintained at the pressure of the pressure medium and the other pressure chamber has a pressure therein which approaches the pressure of the pressure medium when said exhaust valve is closed and which falls when said exhaust valve is open, said valve member for each of said valve devices moving in response to differences in the pressures in its two pressure chambers, and a fluid pressure responsive exhaust valve controller which is adapted to move from a central position wherein both of said exhaust valves are fully closed alternatively to open either of said exhaust valves.

2. In apparatus of the character described, the combination of: two separately operative valve devices; two separately operative driving means adapted to exert opposite actuating forces, one of said valve devices being connected to deliver an operating medium to one of said driving means and the other of said valve devices being connected to deliver an operating medium to the other of said driving means, each of said valve devices having a valve chamber and a valve member positioned therein which is adapted to move between a closed position wherein no operating medium is delivered to its driving means and a fully open position wherein the operating medium is delivered to its driving means at the maximum rate, the valve member of each of said valve devices dividing its valve chamber into two pressure chambers one of which is connected directly to a source of pressure medium and the other of which is connected to the source of pressure medium through a restriction opening in the valve member, the second mentioned of said pressure chambers having an exhaust valve, means biasing said exhaust valve to closed position whereby the first-mentioned pressure chamber is maintained at the pressure of the pressure medium and the other pressure chamber has a pressure therein which approaches the pressure of the pressure medium when said exhaust valve is closed and which falls when said exhaust valve is open, said valve member for each of said valve devices being moved by the pressure medium by the difference in the pressures in its two pressure chambers; and a fluid pressure responsive exhaust valve controller which is adapted to move from a central position wherein both of said exhaust valves are fully closed alternatively to open either of said exhaust valves.

3. In apparatus of the character described, the combination of, two separately operable valve devices, one of said valve devices being constructed to deliver an operating medium to a driving means and the other of said valve devices being constructed to deliver an operating medium to another driving means, each of said valve devices having a cylindrical valve bore and a slidable valve member positioned therein and adapted to move between a closed valve position and an open valve position, each of said valve members having a restriction therein which interconnects an inlet pressure chamber and an outlet pressure chamber within said cylindrical bore and divided by the valve member, said outlet chamber having an exhaust port, means for closing said exhaust port which is opened to exhaust fluid therethrough, means biasing said exhaust port closing means to closed position, and a fluid pressure responsive exhaust controller which is adapted to move from a neutral position wherein both of said exhaust ports are closed alternatively to open either exhaust port of said valve devices.

4. Apparatus as described in claim 3, wherein said controller comprises, a flexible diaphram construction having rigid means extending axially upon opposite sides of said diaphragm construction and wherein each of said exhaust port closing means includes a slidable valve element having means resiliently urging said slidable valve element to its port closing position and which is positioned to be engaged and moved to the open port position by said rigid means.

5. Apparatus as described in claim 3, wherein each of said exhaust port closing means of said outlet chambers comprises a needle valve positioned in said exhaust port to control the exhaust of the operating medium.

6. Apparatus as described in claim 3, wherein each of said valve devices includes an annular valve seat at the inlet end of the bore which is engaged by the valve member to close the bore, a pair of radial ports spaced axially along said bore and interconnected parallel to said bore, each of said valve device constructions comprising an outlet port through which the operating medium is delivered, and said valve member being constructed to provide a passageway intermediate the ends of the valve member and adapted to interconnect one of said radial ports with said outlet port.

References Cited in the file of this patent

UNITED STATES PATENTS

| Number | Name | Date |
|---|---|---|
| 310,061 | Keating | Dec. 30, 1884 |
| 1,267,957 | Barshaw | May 28, 1918 |
| 1,851,502 | Ferris | Mar. 29, 1932 |
| 1,992,048 | Temple | Feb. 19, 1935 |
| 2,489,450 | Crookston | Nov. 29, 1949 |
| 2,534,700 | Crookston | Dec. 19, 1950 |
| 2,673,012 | Harrington | Mar. 23, 1954 |
| 2,778,378 | Presnell | Jan. 22, 1957 |
| 2,780,242 | Dyson | Feb. 5, 1957 |

FOREIGN PATENTS

| Number | Country | Date |
|---|---|---|
| 621 | Great Britain | Feb. 19, 1873 |
| 668,006 | Great Britain | Mar. 12, 1952 |